US010803008B2

(12) United States Patent
Chou et al.

(10) Patent No.: US 10,803,008 B2
(45) Date of Patent: Oct. 13, 2020

(54) FLEXIBLE COUPLING OF PROCESSOR MODULES

(71) Applicant: QUANTA COMPUTER INC., Taoyuan (TW)

(72) Inventors: Le-Sheng Chou, Taoyuan (TW); Tien-Jung Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 52 days.

(21) Appl. No.: 16/142,719

(22) Filed: Sep. 26, 2018

(65) Prior Publication Data
US 2020/0097441 A1    Mar. 26, 2020

(51) Int. Cl.
*G06F 15/80* (2006.01)
(52) U.S. Cl.
CPC ................ *G06F 15/8038* (2013.01)
(58) Field of Classification Search
CPC .... G06F 15/8038; G06F 15/173; G06F 15/17; G06F 15/17381; G06F 13/4022; G06F 13/4027
See application file for complete search history.

(56) References Cited

U.S. PATENT DOCUMENTS

| | | | |
|---|---|---|---|
| 8,954,808 B1 | 2/2015 | McLean et al. | |
| 10,037,299 B1 * | 7/2018 | Ramey | G06F 13/4022 |
| 2005/0196124 A1 * | 9/2005 | Aldereguia | G06F 13/4265 |
| | | | 385/147 |
| 2006/0067066 A1 | 3/2006 | Meier et al. | |
| 2006/0129585 A1 * | 6/2006 | Ishiki | G06F 15/17337 |
| 2007/0139423 A1 * | 6/2007 | Kong | G09G 5/363 |
| | | | 345/502 |
| 2017/0289024 A1 * | 10/2017 | Bernat | H04L 49/10 |

FOREIGN PATENT DOCUMENTS

| | | |
|---|---|---|
| CN | 106776459 A | 5/2017 |
| CN | 107396586 A | 11/2017 |
| CN | 206649376 U | 11/2017 |
| TW | 201541263 A | 11/2015 |

OTHER PUBLICATIONS

Extended European Search Report for EP Application No. 19159790.5 dated Oct. 7, 2019.
TW Office Action for Application No. 108100129, dated Mar. 12, 2020, w/ First Office Action Summary.
TW Search Report for Application No. 108100129, dated Mar. 12, 2020, w/ First Office Action.

* cited by examiner

*Primary Examiner* — Farley Abad
(74) *Attorney, Agent, or Firm* — Nixon Peabody LLP

(57) ABSTRACT

The present disclosure provides flexible coupling of processor modules. An exemplary computing device, according to an embodiment of the present disclosure, can include a processor module with a plurality of processors and a plurality of module output ports associated with each processor. Each of the processors can include a plurality of chip communication channels (CCCs). The CCCs can be coupled to the module output ports of a first processor and can be coupled to other processors in the plurality of processors. The present disclosure additionally provides for a local mode or cooperative mode configuration. A local mode provides for a four-way connection between four processors and a cooperative mode provides for an eight-way connection between eight processors.

18 Claims, 4 Drawing Sheets

FLEXIBLE COUPLING OF PROCESSOR MODULES

FIELD

The present invention relates to processor modules with output ports, and more specifically, to systems and methods for adjusting configurations of the output ports of the processor modules.

BACKGROUND

Computer systems can have multiple processors to increase their computing power. Such processors need to communicate with each other to assign and allocate computing tasks. Often, computer systems can have a first module with four processors. A second module with another four processors can be attached to this module to provide eight processors for the computer system. However, the connection between the first module and the second module is on the motherboard of the computer system. Because the connection is located on the motherboard, the configuration of the first module and the second module typically cannot be altered. For example, once the computer system is in an eight-processor configuration, the computer system cannot be switched to a four-processor configuration without switching out the motherboard.

SUMMARY

The various examples of the present disclosure are directed towards a computing device configured to flexibly connect processor modules in a computing device. An exemplary computing device, according to a first embodiment of the present disclosure, includes a processor module comprising a plurality of processors and a plurality of module output ports. The plurality of module output ports can be associated with each one of the plurality of processors. Each one of the plurality of processors can comprise a plurality of chip communication channels (CCCs). Each one of the plurality of CCCs can be coupled to one of the plurality of module output ports associated with the one of the plurality of processors. A remainder of the plurality of CCCs can be coupled to other ones of the plurality of processors.

In some examples, each of the plurality of CCCs can comprise a point-to-point (PTP) processor interconnection channel.

In some examples, the remainder of the plurality of CCCs can be arranged to couple the plurality of processors in a cross bar configuration. In other examples, the remainder of the plurality of CCCs can be arranged to couple the plurality of processors in a ring configuration.

In some examples, each of the plurality module output ports can be a cable connection port.

In some examples, a controller can be configured for monitoring a connection status for the plurality of module output ports. The controller can configure the processor module to operate in one of a local mode or a cooperative mode based on at least the connection status. The processor module can be configured to operate in the local mode when the connection status indicates that at least one of the plurality of module output ports is inactive. The processor module can be configured to operate in the cooperative mode when the connection status indicates that each of the plurality of module output ports is active.

In some examples, the controller can be further configured for detecting that an alternate connection path is available for the at least one of the plurality of module output ports that is inactive. In response to detecting that an alternate connection path is available, the controller can couple the at least one of the plurality of module output ports that is inactive to the alternate connection path. The controller can configure the processor module to operate in the cooperative mode.

A second embodiment of the present disclosure provides for a computer-implemented method. The method can begin with determining whether a processor module has received a request to operate in a cooperative mode. The processor module can include a plurality of processors and a plurality of module output ports. The plurality of module output ports can be associated with each one of the plurality of processors. If a request has been received, a connection status can be determined for the plurality of module output ports. Thereafter, if an active connection status has been determined for all of the plurality of module output ports, the processor module can then be configured for operating in the cooperative mode with a second processor module.

In some examples, the method can further comprise determining an inactive connection status for at least one of the plurality of module output ports. It is then detected whether an alternate connection path is available for the at least one of the plurality of module output ports that is inactive. In response to detecting that an alternate connection path is available, the at least one of the plurality of module output ports that is inactive can be coupled to the alternate connection path. The processor module can then be configured to operate in the cooperative mode.

A third embodiment of the present disclosure provides for a computing device. The computing device can include a memory and a controller. The memory can store instructions executable by the controller. The instructions, when executed by the controller, can cause the controller to determine whether a request has been received to operate a processor module in a cooperative mode. The processor module can include a plurality of processors and a plurality of module output ports associated with each one of the plurality of processors. In response to determining that the request has been received, the instructions are configured to cause the controller to check a connection status for the plurality of module output ports. The controller can determine an active connection status for all of the plurality of module output ports. The instructions are also configured to cause the controller to configure the processor module to operate in the cooperative mode with a second processor module.

In some examples, the controller can determine an inactive connection status for at least one of the plurality of module output ports. The controller can then detect that an alternate connection path is available for the at least one of the plurality of module output ports that is inactive. The controller can then couple the at least one of the plurality of module output ports that is inactive to the alternate connection path. The processor can then configure the processor module to operate in the cooperative mode.

The words "computer system," "computing system," and "server system" are all used interchangeably in this present disclosure, and can be used to identify any electronic computing system that uses processors to communicate and perform tasks. Such an electronic computing system can include, but not be limited to, a personal computer, a laptop computer, a tablet, and a commercial or private server system.

A "chip communication channel" or "CCC" refers to any channel to the central processing unit where the channel is used for communication with another chip.

A "point-to-point processor interconnect channel" or "PTP processor interconnect channel" refers to any channel that is dedicated for communication with another peer processor, including a UPI channel.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
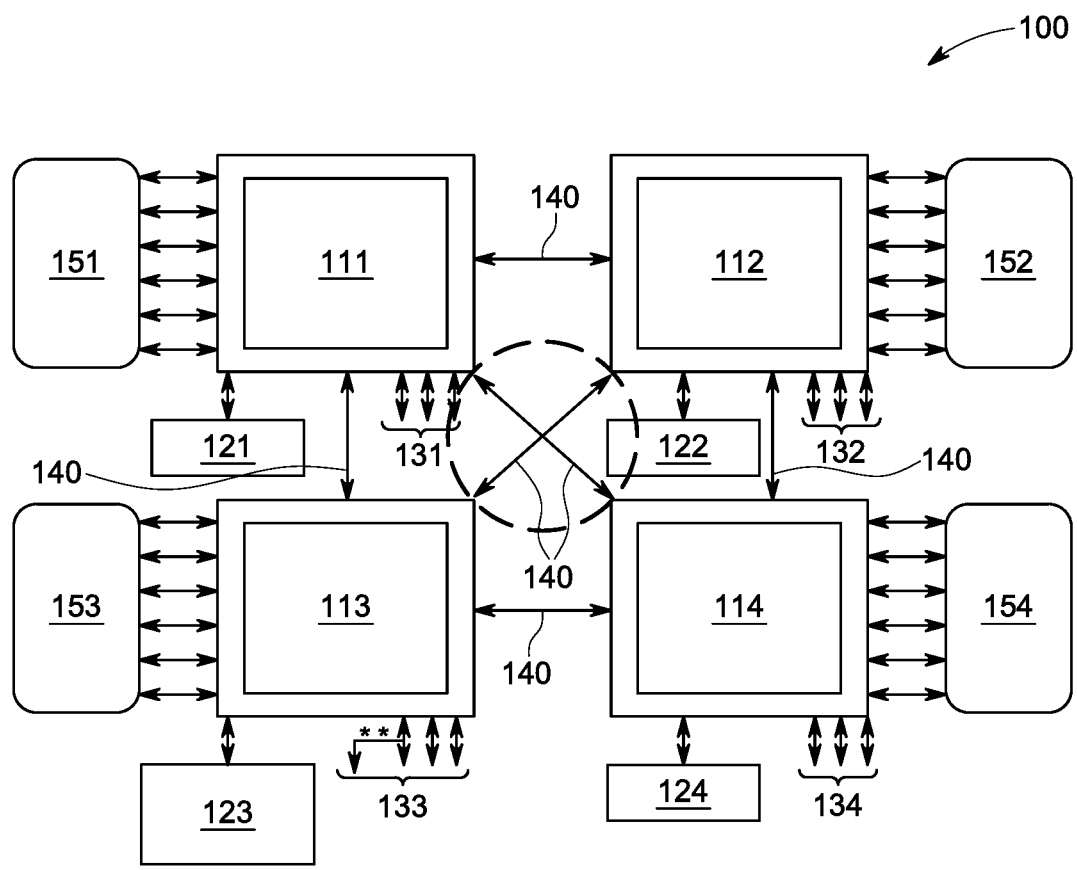
FIG. 1 shows a four-way cross bar coupling of processors according to the prior art.

The present invention is described with reference to the attached figures, where like reference numerals are used throughout the figures to designate similar or equivalent elements. The figures are not drawn to scale. They are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to flexible coupling of processor modules. An exemplary computing device, according to an embodiment of the present disclosure, can include a processor module with a plurality of processors. The exemplary computing device can also include a plurality of module output ports associated with each processor. Each of the processors can include a plurality of chip communication channels (CCCs). The CCCs can be coupled to the module output ports of a first processor and can be coupled to other processors in the plurality of processors. The configuration of the module output ports can therefore be used for configuring the processor module to operate in a local mode or in a cooperative mode. As used herein, the term "local mode" or "local mode of operation" refers to a mode of operation of the processor module in which the processor module operates in isolation, i.e., computing tasks received by the processor module are performed completely by the processor module. As used herein, the term "cooperative mode" or "cooperative mode of operation" refers to a mode of operation of the processor module operates in collaboration with other processor modules, i.e., computing tasks received by the processor module are performed by the processor module or another processor module coupled to the processor module. The local mode can provide for a four-way connection between four processors, while the cooperative mode can provide for an eight-way connection between eight processors. By monitoring a connection status, a computing device, according to an embodiment of the present disclosure, can optionally change whether the processor modules operate in the local mode or the cooperative mode.

Exemplary computing devices, according to embodiments of the present disclosure, configure processor modules to change from a four-way processor configuration in a local mode to an eight-way processor configuration in a cooperative mode. The change can be based on a connection status. These devices provide a flexible coupling between processor modules that can be optionally engaged or disengaged based on the needs of a user. A switching process can enable the transition between the local mode and the cooperative mode without requiring a user to make any physical changes. For example, the switching process can be fixed within the system architecture before a computing device has booted up.

FIG. 1 shows an exemplary computing device 100 which provides a fixed connection between four processors as known in the prior art. The computing device 100 includes processors 111, 112, 113, and 114; motherboard chipsets 121, 122, 123, and 124; peripheral component interconnect express uplink connections (PCIe connections) 131, 132, 133, and 134; UltraPath Interconnect (UPI) links 140; and memory modules 151, 152, 153, and 154.

The computing device 100 can configure the processors 111, 112, 113, and 114 to receive transmissions from each other and send transmissions to each other via the UPI links 140. The motherboard chipsets 121, 122, 123, and 124 each integrate with the other chipsets to provide connections between the processors 111, 112, 113, and 114. The motherboard chipsets 121, 122, 123, and 124 also provide connections between each processor 111, 112, 113, and 114 and a corresponding memory module 151, 152, 153, and 154 where the processors 111, 112, 113, and 114 can access data. The UPI links 140 are configured in the positions pictured in FIG. 1 such that they cannot optionally provide alternate configurations without additional hardware. If the processors 111, 112, 113, and 114 need to connect to any other computer components, they must connect via the PCIe connections 131, 132, 133, and 134. PCIe connections 131, 132, 133, and 134 are not substitutable for UPI links 140 because UPI links provide faster data transfer.

This computing device 100 can provide connections between the processors 111, 112, 113, and 114 in selected configurations. For example, FIG. 1 shows a cross bar configuration in the dotted circle region. This cross bar configuration has UPI links 140 connecting processor 111 and processor 114. The cross bar configuration has additional UPI links 140 connecting processor 112 and processor 113. The four processors 111, 112, 113, and 114 can also be connected via UPI links 140 in a ring configuration where processor 111 connects to processor 112. Processor 112 connects to processor 113 in turn. Processor 113 connects to processor 114 in turn. Processor 114 connects to processor 111. The ring configuration is shown in FIG. 1. The ring configuration is enabled through UPI links 140.

The UPI links 140 provide fixed connections between the four processors 111, 112, 113, and 114 which cannot be altered without additional hardware. Therefore, whichever configuration is selected (the ring configuration or the cross bar configuration) is a permanent configuration for transmissions between the four processors 111, 112, 113, and 114.

Figure 2:
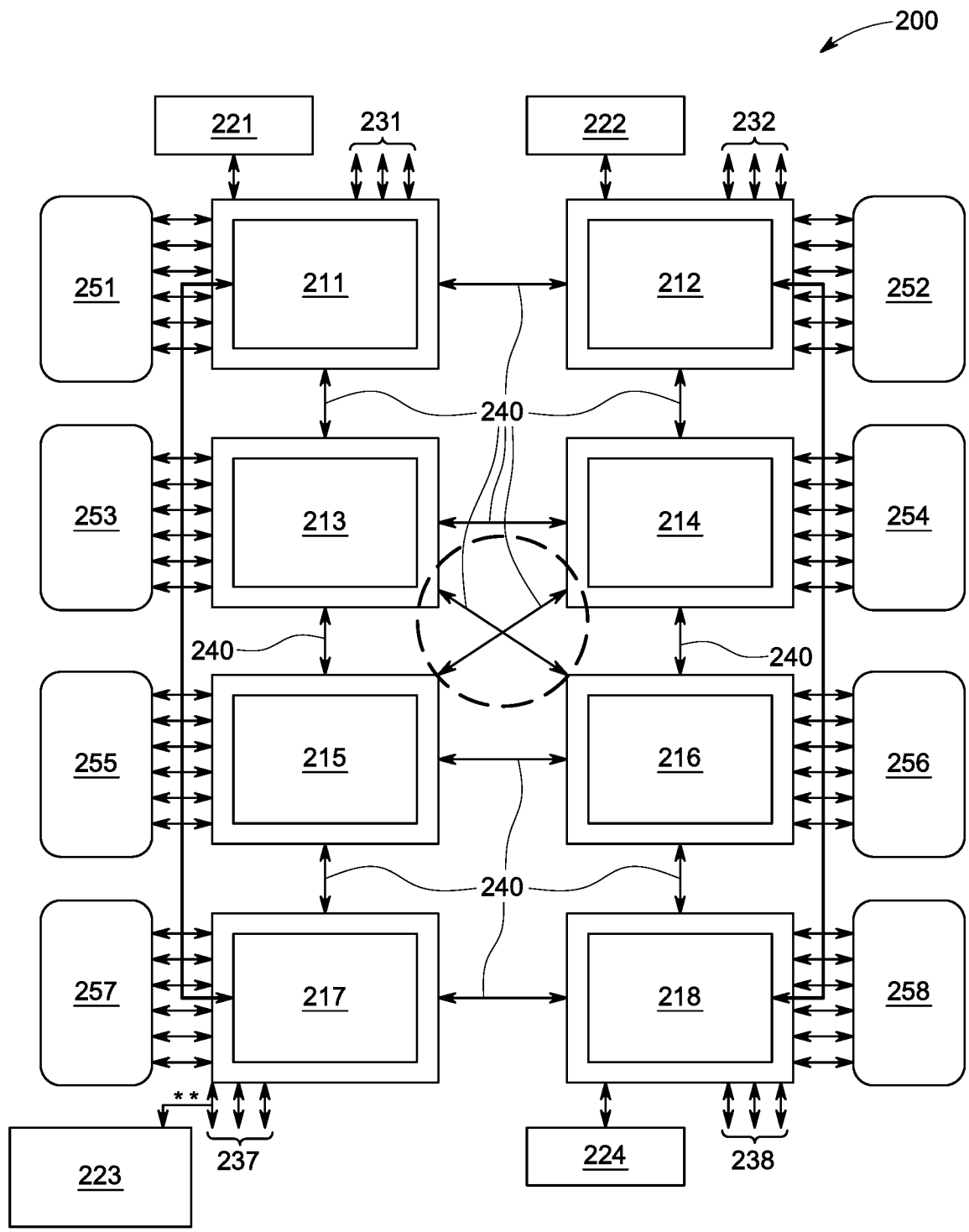
FIG. 2 shows an eight-way cross bar coupling of processors according to the prior art.

FIG. 2 shows another exemplary computing device 200 in the prior art which provides a fixed connection between eight processors. The computing device 200 includes processors 211, 212, 213, 214, 215, 216, 217, and 218; motherboard chipsets 221, 222, 223, and 224; PCIe connections 231, 232, 237, and 238; UPI links 240; and memory modules 251, 252, 253, 254, 255, 256, 257, and 258.

The computing device 200 can configure the eight processors 211, 212, 213, 214, 215, 216, 217, and 218 to receive transmissions from each other and send transmissions to each other via the UPI links 240. The motherboard chipsets 221, 222, 223, and 224 are sub-system devices connected to CPUs 211, 212, 217, and 218, respectively. The motherboard chipsets 221, 222, 223, and 224 can each integrate with the other chipsets to provide connections between the eight processors 211, 212, 213, 214, 215, 216, 217, and 218.

The motherboard chipsets 221, 222, 223, and 224 can also provide connections between the eight processors 211, 212, 213, 214, 215, 216, 217, and 218 and corresponding memory modules 251, 252, 253, 254, 255, 256, 257, and 258. The eight processors 211, 212, 213, 214, 215, 216, 217, and 218 can access data at the memory modules 251, 252, 253, 254, 255, 256, 257, and 258.

The UPI links 240 are configured in the positions pictured in FIG. 2 such that they cannot optionally provide alternate configurations without additional hardware. If the eight processors 211, 212, 213, 214, 215, 216, 217, and 218 need to connect to any other computer components, they must connect via the PCIe connections 231, 232, 237, and 238. PCIe connections 231, 232, 237, and 238 are not substitutable for UPI links 240 because UPI links provide faster data transfer.

This computing device 200 can provide connections between the eight processors 211, 212, 213, 214, 215, 216, 217, and 218 in selected configurations. For example, FIG. 2 shows a cross bar configuration in the dotted circle region. This crossbar configuration has UPI links 240 connecting processor 213 and processor 216 and additional UPI links 240 connecting processor 214 and processor 215. The processors 211, 212, 213, 214, 215, 216, 217 and 218 can also be connected via UPI links 240 in ring configurations through the UPI links 240. For example, processors 211, 212, 213, and 214 are connected in a first ring configuration. Processors 213, 214, 215, and 216 are connected in a second ring configuration. Processors 215, 216, 217, and 218 are connected in a third ring configuration.

The UPI links 240 provide fixed connections between the processors 211, 212, 213, 214, 215, 216, 217 and 218 cannot be altered without switching out the motherboard (not pictured) which contains the UPI links 240. Therefore, whichever configuration is selected (the ring configuration or the cross bar configuration) is a permanent configuration for transmissions between the processors 211, 212, 213, 214, 215, 216, 217 and 218.

Figure 3:
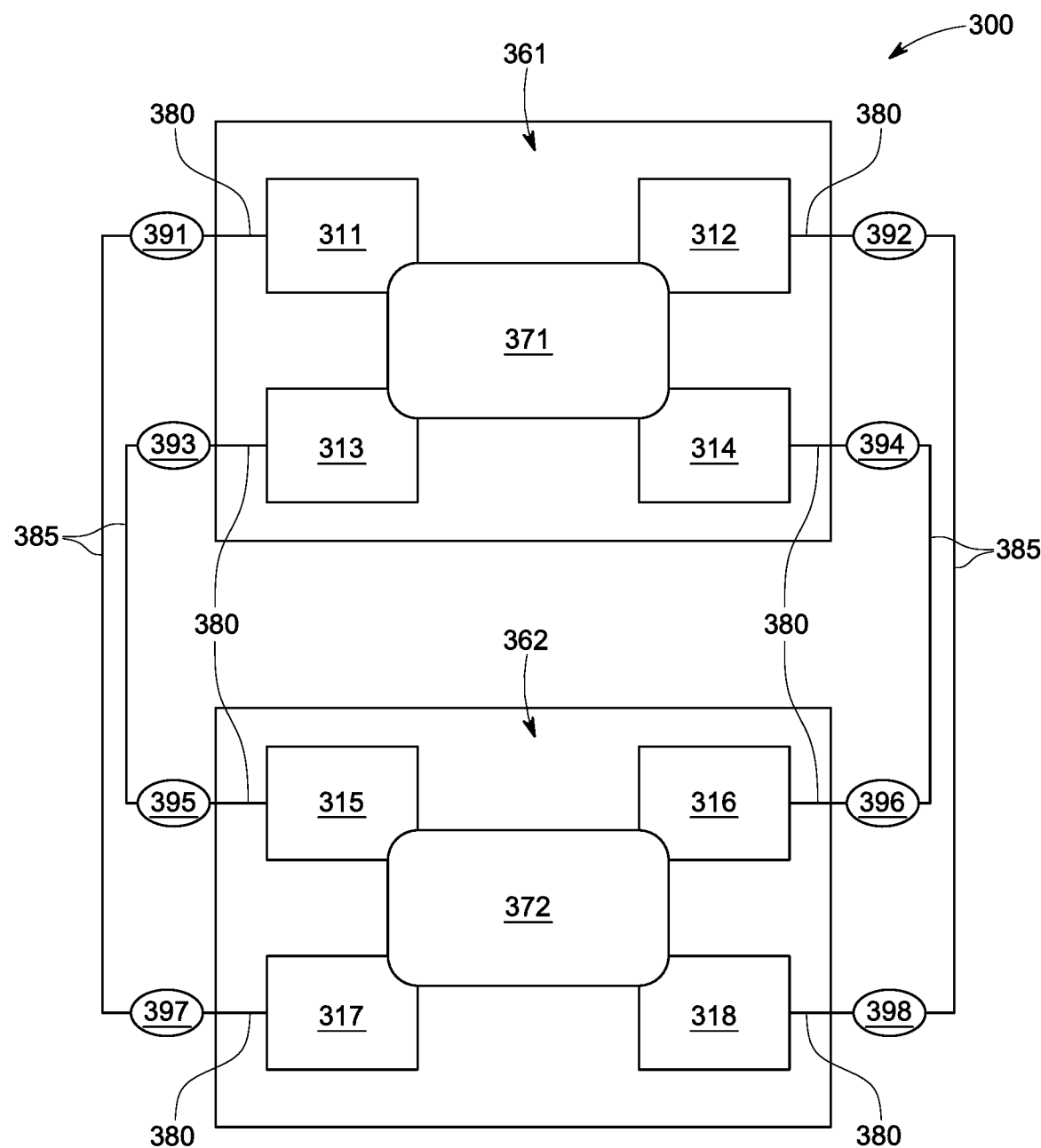
FIG. 3 shows an exemplary system for coupling between two processor modules, according to an embodiment of the present disclosure.

FIG. 3 shows an exemplary computer device 300 with flexible coupling between two processor modules according to an embodiment of the present disclosure. The computing device 300 includes a first server chassis 361 with four processors 311, 312, 313, and 314; a second server chassis 362 with four processors 315, 316, 317, and 318; a first fixed four-way interconnection 371; a second fixed four-way interconnection 372; cable connection ports 391, 392, 393, 394, 395, 396, 397, and 398; UPI links 380; and connection lanes 385.

FIG. 3 is different from FIGS. 1 and 2, which show conventional connections for elements in a computer device, because FIG. 3 does not require motherboard chipsets or PCIe connections to assist with flexible connections between any remaining computer components. Instead, FIG. 3 provides connection lanes 385 which can be flexibly configured to connect to cable connection ports based on a connection status (configuring the connection lanes 385 based on a connection status is discussed further with respect to FIG. 4).

The computing device 300 can configure the four processors 311, 312, 313, and 314 of the first server chassis 361 to receive transmissions from each other and send transmissions to each other via the first fixed four-way interconnection 371. This first fixed four-way interconnection 371 can provide chip communication channels between all four 311, 312, 313, and 314 in a ring and a cross bar configuration. The ring and cross bar configurations can be used simultaneously with each other or independently from each other.

The second fixed four-way interconnection 372 can provide chip communication channels between the four processors 315, 316, 317, and 318 of the second server chassis 362 in a similar manner. The chip communication channels of the first fixed four-way interconnection 371 and the second fixed four-way interconnection 372 can be any sort of communication lane technology in a computer system, including signal traces, cables, or any other sort of connection technology, without limitation. In some embodiments, the first fixed four-way interconnection 371 and the second fixed four-way interconnection 372 can be flexible so as to alternate between one or more connection configurations. For example, they can alternate between a ring and a cross bar configuration.

Each of the eight processors 311, 312, 313, 314, 315, 316, 317, and 318 can be attached to a cable connection port 391, 392, 393, 394, 395, 396, 397, and 398 via a UPI link 380. The cable connection ports 391, 392, 393, 394, 395, 396, 397, and 398 can have transmit paths and receive paths. The transmit path and the receive path can occur through sets of signal traces on a system motherboard. Each set of signal traces can include one or more signal traces. For example, the transmit path and the receive path for each cable connection port 391, 392, 393, 394, 395, 396, 397, and 398 can each include twenty lanes of communication. The cable connection ports 391, 392, 393, 394, 395, 396, 397, and 398 can be endpoints of communication in a computer system and can be reserved for specific types of communication. In some embodiments of the present disclosure, the cable connection ports 391, 392, 393, 394, 395, 396, 397, and 398 can be UPI ports or any other type of cable connection ports for a processor. UPI ports have the advantage of providing low-latency connections for multiprocessor systems with a shared address space. UPI ports can also provide high transfer speed of up to 10.4 GT/s. However, the present disclosure is not limited to any particular type of cable connection port. In general, the cable connection ports can accommodates high speed transmissions.

Similarly, the UPI link 380 which connects each cable connection port 391, 392, 393, 394, 395, 396, 397, and 398 to a corresponding processor 311, 312, 313, 314, 315, 316, 317, and 318 can be any sort of communication lane technology in a computer system, including signal traces, cables, UPI cables, or any other connection technology, without limitation. In general, the communication lane technology can be any sort of bus connections between processors. For example, the UPI links 380 can be referred to as point-to-point processor interconnection channels because they are dedicated to communication with another peer processor.

The computer device 300 also provides connection lanes 385 between the processors of the first server chassis 361 and the second server chassis 362. The connection lanes 385 can be any sort of communication lane technology in a computer system, including signal traces, cables, UPI cables, point-to-point processor interconnection channels, or any other sort of connection technology, without limitation. For example, connection lanes 385 can connect the cable connection port 391 of processor 311 to the cable connection port 397 of processor 317. For example, connection lanes 385 can connect the cable connection port 392 of processor 312 to the cable connection port 398 of processor 318. For example, connection lanes 385 can connect the cable connection port 393 of processor 313 to the cable connection port 395 of processor 315. For example, connection lanes 385 can connect the cable connection port 394 of processor 314 to the cable connection port 396 of processor 316. Any combination of connection lanes 385 can be used to connect the eight processors 311, 312, 313, 314, 315, 316, 317, and 318.

These UPI links 380 can be controlled by a controller (not pictured) in the computing device 300 which monitors a connection status and configures the server chassis 361 and 362 to operate in a local mode or in a cooperative mode. For example, the controller can be a processor.

In a local mode, the server chassis 361 and 362 would operate respectively from the first flexible four-way interconnection 371 and the second flexible four-way interconnection 372 without receiving input from any of the cable connection ports 391, 392, 393, 394, 395, 396, 397, and 398. In a cooperative mode, the server chassis 361 and 362 ignore the first fixed four-way interconnection 371 and the second fixed four-way interconnection 372. The server chassis 361 and 362 receive input and send output exclusively from the cable connection ports 391, 392, 393, 394, 395, 396, 397, and 398.

Therefore, the present disclosure provides for flexible connections between processors within a single server chassis and between processors across different server chassis. The present disclosure makes use of cable connection ports which can optionally receive input from processors on another server chassis. This allows the computing device 300 to be operated via four processors or eight processors depending on the needs of a user.

Figure 4:
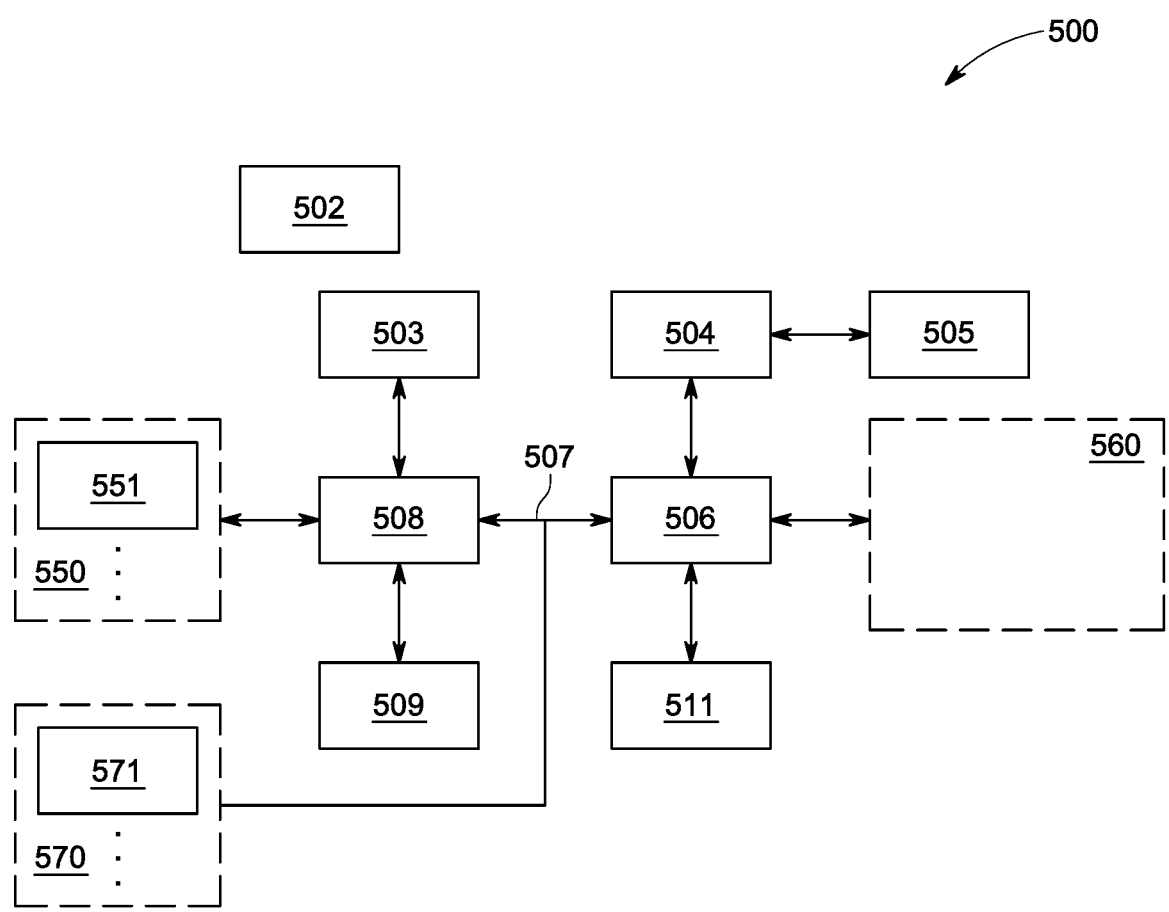
FIG. 4 is a schematic block diagram illustrating an exemplary system, according to an embodiment of the present disclosure.

A brief introductory description of example systems and networks, as illustrated in FIG. 4, is disclosed herein. These variations shall be described herein as the various examples are set forth. The present disclosure now turns to FIG. 4.

FIG. 4 is a schematic block diagram illustrating an exemplary server system 500, in accordance with an implementation of the present disclosure. In this example, the server system 500 includes at least one microprocessor or processor 504; a BMC 503; one or more cooling modules 560; a main memory (MEM) 511; and at least one power supply unit (PSU) 502 that receives an AC power from an AC power supply 501, and provides power to various components of the server system 500, such as the processor 504, north bridge (NB) logic 506, PCIe slots 560, south bridge (SB) logic 508, storage device 509, ISA slots 550, PCI slots 570, and BMC 503.

After being powered on, the server system 500 is configured to load software application from memory, a computer storage device, or an external storage device to perform various operations. The storage device 509 is structured into logical blocks that are available to an operating system and applications of the server system 500. The storage device 509 is configured to retain server data even when the server system 500 is powered off.

In FIG. 4, the memory 511 is coupled to the processor 504 via the NB logic 506. The memory 511 may include, but is not limited to, dynamic random access memory (DRAM), double data rate DRAM (DDR DRAM), static RAM (SRAM), or other types of suitable memory. The memory 511 can be configured to store firmware data of the server system 500. In some configurations, firmware data can be stored on the storage device 509.

In some implementations, the server system 500 can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 504 can be a central processing unit (CPU) configured to execute program instructions for specific functions. For example, during a booting process, the processor 504 can access firmware data stored in the BMC 503 or the flash storage device, and execute the BIOS 505 to initialize the server system 500. After the booting process, the processor 504 can execute an operating system in order to perform and manage specific tasks for the server system 500.

In some configurations, the processor 504 can be multi-core processors, each of which is coupled together through a CPU bus connected to the NB logic 506. In some configurations, the NB logic 506 can be integrated into the processor 504. The NB logic 506 can also be connected to a plurality of peripheral component interconnect express (PCIe) slots 560 and an SB logic 508 (optional). The plurality of PCIe slots 560 can be used for connections and buses such as PCI Express x1, USB 2.0, SMBus, SIM card, future extension for another PCIe lane, 1.5 V and 3.3 V power, and wires to diagnostics LEDs on the server system 500's chassis.

In system 500, the NB logic 506 and the SB logic 508 are connected by a peripheral component interconnect (PCI) Bus 507. The PCI Bus 507 can support functions on the processor 504 but in a standardized format that is independent of any of the processor 504's native buses. The PCI Bus 507 can be further connected to a plurality of PCI slots 570 (e.g., a PCI slot 571). Devices connect to the PCI Bus 507 may appear to a bus controller (not shown) to be connected directly to a CPU bus, assigned addresses in the processor 504's address space, and synchronized to a single bus clock. PCI cards that can be used in the plurality of PCI slots 570 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 508 can couple the PCI Bus 507 to a plurality of expansion cards or ISA slots 550 (e.g., an ISA slot 551) via an expansion bus. The expansion bus can be a bus used for communications between the SB logic 508 and peripheral devices, and may include, but is not limited to, an industry standard architecture (ISA) bus, PC/504 bus, low pin count bus, extended ISA (EISA) bus, universal serial bus (USB), integrated drive electronics (IDE) bus, or any other suitable bus that can be used for data communications for peripheral devices.

In this example, BIOS 505 can be any program instructions or firmware configured to initiate and identify various components of the server system 500. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In system 500, the SB logic 508 is further coupled to the BMC 503 that is connected to the PSU 502. In some implementations, the BMC 503 can also be a rack management controller (RMC). The BMC 503 is configured to monitor operation status of components of the server system 500, and control the server system 500 based upon the operation status of the components.

Although only certain components are shown within the exemplary systems 500 in FIG. 4, various types of electronic or computing components that are capable of processing or storing data, or receiving or transmitting signals, can also be included in the exemplary system 500. Further, the electronic or computing components in the exemplary system 500 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 500, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, FIG. 4 is used for purposes of explanation. Therefore, a network system can be implemented with many variations, as appropriate, yet still provide a configuration of network platform in accordance with various examples of the present disclosure.

In exemplary configurations of FIG. 4, the exemplary system 500 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computing device, comprising:
   a processor module comprising a plurality of processors and a plurality of module output ports associated with each one of the plurality of processors; and
   a controller configured for monitoring a connection status for the plurality of module output ports and configuring the processor module to operate in one of a local mode or a cooperative mode based at least on the connection status, the processor module being configured to operate in the local mode when the connection status indicates that at least one of the plurality of module output ports is inactive,
   wherein each one of the plurality of processors comprises a plurality of chip communication channels (CCCs), wherein one of the plurality of CCCs is coupled to one of the plurality of module output ports associated with the one of the plurality of processors, and wherein a remainder of the plurality of CCCs is coupled to other ones of the plurality of processors.

2. The computing device of claim 1, wherein each of the plurality of CCCs comprises a point-to-point (PTP) processor interconnection channel.

3. The computing device of claim 1, wherein the remainder of the plurality of CCCs is arranged to couple the plurality of processors in a cross bar configuration.

4. The computing device of claim I, wherein the remainder of the plurality of CCCs is arranged to couple the plurality of processors in a ring configuration.

5. The computing device of claim 1, wherein each of the plurality of module output ports is a cable connection port.

6. The computing device of claim 1, wherein computing operations for the local mode are performed by the processor module in isolation.

7. A computing device, comprising:
   a processor module comprising a plurality of processors and a plurality of module output ports associated with each one of the plurality of processors; and a controller configured for monitoring a connection status for the plurality of module output ports and configuring the processor module to operate in one of a local mode or a cooperative mode based at least on the connection status, the processor module being configured to operate in the cooperative mode when the connection status indicates that each of the plurality of module output ports is active, wherein each one of the plurality of processors comprises a plurality of chip communication channels (CCCs), wherein one of the plurality of CCCs is coupled to one of the plurality of module output ports associated with the one of the plurality of processors, and wherein a remainder of the plurality of CCCs is coupled to other ones of the plurality of processors.

8. The computing device of claim 7, wherein computing operations for the cooperative mode are performed b the processor module or another processor module coupled to the processor module.

9. The computing device of claim 7, wherein each of the plurality of CCCs comprises a point-to-point (PIP) processor interconnection channel.

10. The computing device of claim 7, wherein the remainder of the plurality of CCCs is arranged to couple the plurality of processors in a cross bar configuration.

11. The computing device of claim 7, wherein the remainder of the plurality of CCCs is arranged to couple the plurality of processors in a ring configuration.

12. The computing device of claim 7, Wherein each of the plurality of module output ports is a cable connection port.

13. A computing device, comprising:
a processor module comprising a plurality of processors and a plurality of module output ports associated with each one of the plurality of processors; and
a controller configured for monitoring a connection status for the plurality of module output ports and configuring the processor module to operate in one of a local mode or a cooperative mode based at least on the connection status, the controller further configured for detecting that an alternate connection path is available for at least one of the plurality of module output ports that is inactive; and in response to detecting that an alternate connection path is available, coupling the at least one of the plurality of module output ports that is inactive to the alternate connection path and configuring the processor module to operate in the cooperative mode, wherein each one of the plurality of processors comprises a plurality of chip communication channels (CCCs), wherein one of the plurality of CCCs is coupled to one of the plurality of module output ports associated with the one of the plurality of processors, and wherein a remainder of the plurality of CCCs is coupled to other ones of the plurality of processors.

14. The computing device of claim 13, wherein each of the plurality of CCCs comprises a point-to-point (PTP) processor interconnection channel.

15. The computing device of claim 13, wherein the remainder of the plurality of CCCs is arranged to couple the plurality of processors in a cross bar configuration.

16. The computing device of claim 13, wherein the remainder of the plurality of CCCs is arranged to couple the plurality of processors in a ring configuration.

17. The computing device of claim 13, wherein each of the plurality of module output ports is a cable connection port.

18. The computing device of claim 13, wherein computing operations for the cooperative mode are performed by the processor module or another processor module coupled to the processor module.

* * * * *